Jan. 26, 1932.  E. G. GAUBERT  1,842,966
ELECTRIC MOTOR
Filed April 12, 1930
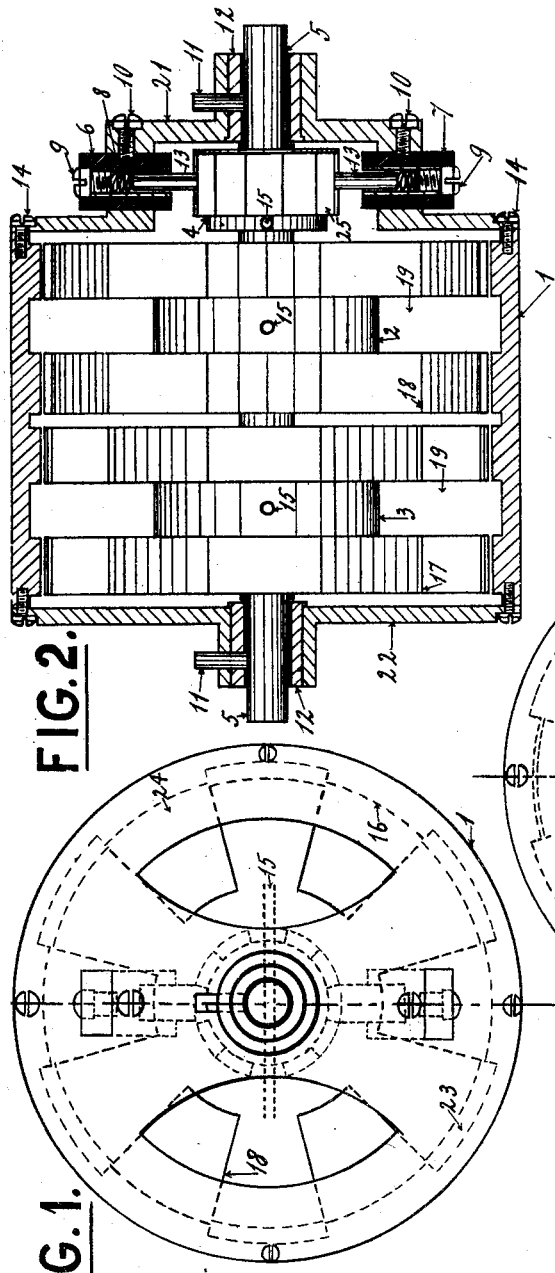
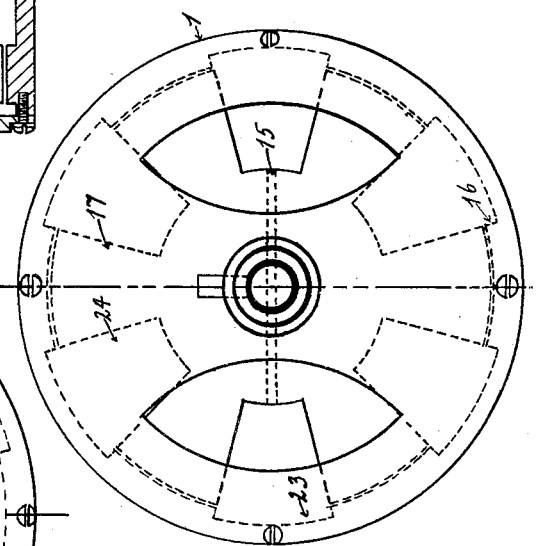
INVENTOR
Edgar Gustave Gaubert.
BY
ATTORNEY Patented Jan. 26, 1932

1,842,966

UNITED STATES PATENT OFFICE

EDGAR GUSTAVE GAUBERT, OF WEST BRIGHTON, STATEN ISLAND, NEW YORK

ELECTRIC MOTOR

Application filed April 12, 1930. Serial No. 443,773.

Reference is made to the drawings forming part of this specification in which similar figures indicate corresponding parts.

Figure 1 is a front view of my device.

Figure 2 is a view of a full longitudinal side section of the soft iron stator member and brush holders together with a longitudinal side view of the two wound rotor members and all other rotary and stationary parts of my device in adjusted position except the wire coils and their connections which, if included, might interfere with a thorough comprehension of the drawings.

Figure 3 is a rear view of my device.

As shown in the figures mentioned the apparatus comprises a soft iron stator member number 1 having two similar annularly disposed parallel sets, each set of six twin equidistant internal and similar stationary armature projections. Each armature projection measures, thirty degrees $\frac{1}{12}$th part of the internal addendum circumference formed by a set of six projections.

The longitudinal side length of each set of these twin projections is equal to the longitudinal side length of one wound rotor member described below.

My device also comprises two soft iron toothed cylinders numbers 2 and 3 Figure 2 each toothed cylinder having two separate and similar sets of annularly disposed side by side, equidistant parallel and similar projections numbers 17 and 18, said cylinders forming the two wound rotor members of my device.

The addendum circumference thus formed by the projections of these wound rotor members fits exactly and turns freely without friction within the inner addendum circumference formed by the projections of the stator member. Each projection of the rotor members and also the spaces number 24 Figure 3 separating these projections measures thirty degrees, i. e. $\frac{1}{12}$th part of the addendum circumference formed by the six projections of a set.

In a groove number 19 Figure 2 between the two sets of projections of each rotor member a coil of insulated copper wire is wound in annular direction around the rotor member on the clearance or root cylindric circumference. These two wound rotor members are attached in their center, side by side to a shaft number 5 Figure 2 by a screw or pin fitted into holes number 15.

These two wound rotor members are adjusted in such position that when placed within the stator member the projections number 17 Figure 3 of the one wound rotor member will stand in juxtaposition with the projections number 16 Figure 3 of the soft iron stator member while the projections number 18 of the other wound rotor member will stand in juxtaposition of the spaces number 23 or just between the projections number 16 of the stator member as indicated in Figure 1.

Thus every 12th of a complete turn of the shaft and wound rotor members will change the position of the rotor member projections in relation to the stator member projections.

Side by side with the right wound rotor member number 2 a commutator number 4 Figure 2 stationary in relation to the rotary members is also attached to the shaft with a pin or screw passing through opening number 15.

This commutator has twelve evenly spaced insulated conducting bars number 25 and is adjusted to the shaft in such position that as regards a common center the circumference arcs of the commutator bars correspond proportionally with the circumference arcs of the projections of the wound rotor members. The six alternate bars, say 1, 3, 5, 7, 9, 11 of this commutator thus occupying the same proportional circumferential arcs as the projections of the right wound rotor member are connected to the insulated wire coil wound around the left wound rotor member as follows: Three of these six bars taken in consecutive circular order say 1, 3, 5 are connected to the one end of the wire coil while the three remaining or opposite bars say 7, 9, 11 are connected to the other end of the wire coil.

The other six alternate commutator bars say 2, 4, 6, 8, 10, 12 are connected similarly to the other insulated wire coil wound between the projections of the right wound rotor member say bars 2, 4, 6, connected at the one end and bars 8, 10, 12 connected at the other end.

The front and rear motor frame parts numbers 21 and 22 have each a center opening in which a copper tube is inserted to avoid overheating of the shaft number 5 which rotates in said tube number 12.

These two frame parts are attached to the soft iron stator member by screws number 14, and frame part number 21 has furthermore two openings in which two insulated brush holders numbers 6 and 7 are kept in vertical opposite position and attached by screws number 10.

These brush holders can be turned slightly so as to retard and advance the contact of the brushes number 13 on the commutator bars. These brushes number 13 are pressed towards the commutator bars by springs number 8 which are in contact with screws 9.

The frame parts, rotor and stator members, brush holders, brushes, shaft, commutator, wire coils and all other parts being assembled and adjusted as indicated, one feed wire is attached to screw 9 of the upper brush holder number 6 and the other feed wire to screw 9 of the lower brush holder number 7.

As soon as the electric current passes through the wire coil of the right wound rotor member which becomes a strong multipolar electromagnet all the projections number 18 of the right wound rotor member are attracted to the projections of the stator member. When these projections have turned $\frac{1}{12}$th of a complete turn and stand in juxtaposition of the stator member projections the contact of the brushes with the corresponding commutator bars of their wire coil is interrupted and changed to a contact of the brushes and commutator bars connected to the wire coil of the left wound rotor member number 3 the projections of which now have been brought in juxtaposition of the spaces number 23 Figure 1.

As soon as this contact is made the left wound rotor member becomes energized and its twelve magnetic projections are attracted to the stator member projections. Once the left rotor member projections number 17 stand in juxtaposition with the stator member projections number 16 this operation of contact is again reversed from left to right rotor member and so on. Thus the motor keeps running with a uniform speed and pull as long as the electric current is allowed to pass through the wire coils.

For each multipolar magnetic rotor member thus described the magnetic poles of the one side say the right annular side are all of one same magnetic polarity and those of the left annular side are all of the other magnetic polarity.

It is immaterial whether the electric current be a direct or alternate current used to energize the rotor members and no attention has to be given to the magnetic polarities in construction or wire winding of this motor since the projections of the rotor members in relation to their juxtaposed stator member projections will always have different magnetic polarities through being placed in an opposite position as to the wire coil.

The number of projections on the rotor members and stator members as well as the commutator bars can be correspondingly increased or decreased if desired.

Two oil or grease feeders number 11 Figure 2 are fitted into frame parts 21 and 22 to prevent overheating and facilitate the rotation of the shaft.

The motor can be operated in either direction by regulation of the brush holders and brushes.

Having thus described my invention as above I claim as new and desire to secure by Letters Patent:

1. An electric motor comprising two similar soft iron multipolar wound rotor members, the poles of each wound rotor member forming two separate annular sets of similar equidistant side by side parallel projections and the two wound rotor members being so constructed and disposed side by side that as regards a common center the projected poles of the one wound rotor member occupy the corresponding addendum circumferential arcs or spaces which separate the projected poles of the other wound rotor member, a commutator therefor which is stationary in relation to the wound rotor members and a soft iron stator member comprising two similar and separate annular internal sets of twin equidistant parallel projections disposed side by side and the projections of which, as regards a common center, correspond in position and measurement with the projections of one of the two wound rotor members, and means of supplying an electric current to said wound rotor members through insulated copper wire wound in annular direction between the two sets of projections or poles of each wound rotor member on the cylindric root circumference so as to separate the entire one set of projections from the other set of projections of each wound rotor member by a wire coil which being connected to the commutator bars is used to energize the two wound rotor members.

2. An electric motor comprising two similar soft iron multipolar wound rotor members, the magnetic poles of each constituting two separate similar annular sets of equidistant side by side parallel projections and the two wound rotor members being held in unison and being so constructed and disposed side by side that, as regards a common center, the projected poles of the one wound rotor member occupy the corresponding addendum circumferential arcs or spaces which separate the projected poles of the other wound rotor member, two coils of insulated copper wire one coil being wound in annular direction between the two sets of projections or poles of each rotor member on the root cylindric circumference so as to separate the entire one set of projections from the other set of projections of each rotor member by a coil of wire, a commutator therefor which is stationary in relation to the rotor members and has as many evenly spaced insulated conducting bars as the number of twin polar projections of the two rotor members, said commutator being adjusted in such position that its bars occupy the same proportional arcs as the arcs occupied by the projections of the wound rotor members, two brushes stationary as regards the soft iron stator member each brush being connected with one of the feed wires and engaging said commutator bars at points substantially opposite each other the connections between the wire coils of the wound rotor members and the commutator bars being made in such a way that for each change of contact the brushes make from one commutator bar to another commutator bar when the commutator is in rotation the flow of electric current is transferred from the wire coil of the one wound rotor member to the wire coil of the other wound rotor member thus changing the magnetic attraction from left to right or vice versa each time the brushes make a change from one commutator bar to a successive other commutator bar.

In testimony whereof I have signed my name to this specification.

EDGAR GUSTAVE GAUBERT.